United States Patent Office 3,740,364
Patented June 19, 1973

3,740,364
INHIBITION OF DISCOLORATION OF PAINTS CONTAINING DRIERS
Helmut Schuler and Uwe Thies, Goslar, Germany, assignors to Firma Gebr. Borchers AG, Goslar, Germany
No Drawing. Filed Sept. 11, 1970, Ser. No. 71,357
Claims priority, application Germany, Sept. 13, 1969,
P 19 46 478.9
Int. Cl. C09d 3/64
U.S. Cl. 260—22 A                                    3 Claims

ABSTRACT OF THE DISCLOSURE

Discoloration of paints containing driers is inhibited by the incorporation therein of certain phosphoric acid esters or metal or amine salts thereof. The esters have the formula

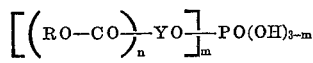

R is $C_{1-6}$ lower alkyl radical,
Y is di- or tri-valent aliphatic or aromatic radical, and
n and m are each 1 or 2.

---

This application has to do with paints containing driers, and with additives which prevent or reduce the discoloration of such paints.

BACKGROUND OF THE INVENTION

Paints which dry oxidatively, and the drying of which is caused by the addition of a heavy metal soap of an organic acid, such as naphthenic acids, linseed oil fatty acids, resin acids, alpha-ethyl hexanoic acid, or other synthetic acids, are subject to discoloration, or yellowing of white paints, transparent coatings or polyester condensates applied to light substrates. The original color hue of white paints is measurably degraded upon the addition thereto of a drier. Depending on the strength of the siccative, various color shades can arise with white paints. This undesirable characteristic of oxidatively drying previously could not be avoided or remedied. Efforts have been made to obtain lightening of colors tending to darken, by specific addition of various color additives to white paints and high temperature paints. To date, satisfactory results have not been obtained by such efforts.

SUMMARY OF THE INVENTION

In accordance with this invention, there are provided paints containing conventional driers and certain phosphoric acid esters, and/or salts thereof, which are free or substantially free of discoloration. The phosphoric acid esters are represented by the general formula

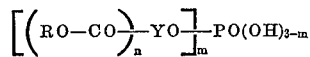

wherein
R is a lower alkyl radical $C_{1-6}$,
Y is a di- or tri-valent aliphatic or aromatic radical,
n is 1 or 2, and
m is 1 or 2.

SPECIFIC EMBODIMENTS OF THE INVENTION

The phosphoric acid esters of this invention are derived from mono- and poly-basic hydroxycarboxylic acid esters, such as glycol acid butyl ester, hydroxy propionic acid ethyl ester, hydroxy-i-caproic acid butyl ester, hydroxyphenyl acetic acid methyl ester, hydroxybenzoic acid ethyl ester, hydroxyphthalic acid ethyl ester, etc.

Metal salts of these phosphoric acid esters have metal components of the type used for conventional driers, namely, cobalt, manganese, lead, calcium, zinc, cerium, vanadium and others. As indicated above, a metal salt can be used instead of in admixture or with a phosphoric acid ester. Such an additive to a white paint lightens the same, particularly after artificial aging, for example 15 hours at 95° C. to such an extent that the whiteness value corresponds to that for the paint free of a drier.

For use in the invention, amine salts of phosphoric acid esters are preferred, in combination with metallic soaps used in general practice, for example metal naphthenates and salts of synthetic acids such as alpha-ethyl hexanoic acid. The same lightening is observed as with use of the metal salts of the phosphoric acid esters. Suitable amines to form the salts with the phosphoric acid esters identified above are, for example, dialkyl (e.g. methyl, ethyl, etc.) cyclohexyl amine, dicyclohexyl amine, trialkanolamine as triethanol amine and others.

The phosphoric acid esters to be used in accordance with the invention are known in the art. They can be prepared according to known processes by reaction of a mono- or poly-basic hydroxy carboxylic acid ester with phosphorus pentoxide in a mol proportion of 3 to 1, with mixtures of mono- and di-esters being formed. The mixtures can be used as well as individual mono-basic ester or an individual di-basic ester, and neutralized with a suitable amine.

With the addition of a phosphoric acid ester, or salt thereof and particularly an amine salt, in accordance with the present invention, to paints containing driers, discoloration is prevented in all instances. Paints as contemplated herein are covering or coating substances in accordance with German specification DIN 55 945, that is, liquid or pasty, physically or chemically drying substances or mixtures of substances which can be applied by means of brushing, spraying, dipping, floating, or by other means on surfaces and which provide a covering coating. They usually consist of binders, pigments, driers, plasticizers and fillers.

Adding the aforementioned phosphoric acid esters, or salts thereof to paint compositions, that is after addition of the conventional driers, or by addition to pigments to be ground, a noticeable lightening is observed in each instance, which corresponds in whiteness to that of an original coat of a white paint free of a drier. Discoloration of clear lacquers, and coatings, which may arise due to the inherent coloring of various dryers, is reduced. Further, the tendency of white paints to become green due to cobalt is reduced. To reach optimum lightening, it is desirable to let the base paint age for 72 hours. Paints including high-temperature coatings show no, or only a very small tendency, to yellow after addition of one or more of the phosphorus-containing additives described above. Films of high-temperature paints formed from various materials lightened even when subjected to high temperatures. Further, the so-called "pot life" of reactively drying paints was not influenced. Rusting of steel beneath coatings is reduced by the addition of one or more of the phosphorus-containing additives described above.

The quantities to be used are from about 0.05 to about 3 percent by weight of the total paint compositions. In oxidatively air-drying paints, an amount of from about 0.1 to about 1 percent is recommended. The quantity to be added to high-temperature compositions can vary between about 0.1 to about 3 percent. Polyester condensate compositions with a cobalt or vanadium accelerator require an amount of between about 0.05 and about 0.1 percent. The "pot life" is not delayed by such a concentration. Upon addition of one or more of said phosphorus-containing additives, it has further been observed that separation of pigments and fillers in the paints is substantially reduced, that the formation of skin is delayed and that the flowability is not inhibited.

The present invention is illustrated by the following examples.

EXAMPLE 1

A white paint having the following composition, was used:

| | Parts |
|---|---|
| Binder (long oil alkyd based on linseed oil) | 57.5 |
| Titanium dioxide | 35.0 |
| Naphthenate mixture containing cobalt, lead and manganese naphthenates with metal content: 0.75 percent cobalt, 11 percent lead and 0.75 percent manganese | 1.0 |
| Turpentine | 7.0 |

One part of the dimethylcyclohexyl amine salt of glycol acid butyl phosphate ester was mixed into the paint.

Testing was carried out by examining a paint covering on a glass plate, after drying, with a layer thickness of 35–40 microns, and measuring the white level with an Erichsen whiteness meter. As standards barium sulfate is equal to a 99 percent whiteness value and color tone RAL 1015 is equal to a 0 percent whiteness value.

Test results are given below in Table I.

TABLE I

| Composition: | Percent whiteness |
|---|---|
| (1) Ex. 1 without drier, not aged | 90 |
| (2) Ex. 1 with drier, not aged | 76 |
| (3) Ex. 1 with drier, not aged, and with 1% of the amine salt | 90 |
| (4) Ex. 1 with drier, aged 15 hours at 95° C. | 53 |
| (5) Ex. 1 with drier, aged 15 hours, at 95° C., and with 1% of the amine salt | 84 |

EXAMPLE 2

After addition of quantities of from 0.05 to 0.1 percent of weight of the salt of Example 1 to a polyester coating composition, described below, test samples, after hardening, were substantially lightened in comparison to similar samples without the additive.

The polyester coating composition comprised:

90.5 parts polyester resin [1]
0.37 part cobalt octoate, 6% Co
9.13 parts organic peroxide [2]

[1] Upe Prüflack L 3025 A, Th. Votteler, Münchingen.
[2] Upe Zusatzlack 2122, Th. Votteler, Münchingen.

We claim:

1. In a paint composition containing a polyester resin and a cobalt, manganese, lead, calcium, zinc, cerium or vanadium metal soap drier, the improvement which comprises
   from about 0.05 to about 3 percent by weight of a compound selected from the group consisting of a phosphoric acid ester having the following general formula

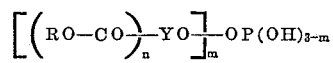

wherein
   R is a lower alkyl radical $C_{1-6}$,
   Y is a di- or tri-valent aliphatic or aromatic radical,
   n is 1 or 2, and
   m is 1 or 2, a cobalt, manganese, lead, calcium, zinc, cerium or vanadium metal salt of said ester, and an alkyl, cycloalkyl or alkanol amine salt of said ester.

2. A composition of claim 1 containing an alkyd resin.

3. A composition of claim 1, wherein the salt is a dimethylcyclohexyl amine salt of glycol acid butyl phosphate ester.

References Cited
UNITED STATES PATENTS

| 2,153,511 | 4/1939 | Cheetham et al. | 260—22 |
| 3,415,788 | 12/1968 | Jedlicka | 260—75 |
| 2,881,145 | 4/1959 | Schmutzler | 260—22 |
| 3,396,130 | 8/1968 | Leistner et al. | 260—23 |

DONALD E. CZAJA, Primary Examiner

RONALD W. GRIFFIN, Assistant Examiner

U.S. Cl. X.R.

117—124 E, 161 K; 260—30.6 R, 32.4, 924, 941, 942